United States Patent [19]

Shevers, Jr.

[11] Patent Number: 5,615,817

[45] Date of Patent: Apr. 1, 1997

[54] KNEEBOARD WITH SUPPORT EAR

[75] Inventor: Harold Shevers, Jr., Cincinnati, Ohio

[73] Assignee: Sportsman's Market, Inc., Batavia, Ohio

[21] Appl. No.: 538,735

[22] Filed: Oct. 3, 1995

[51] Int. Cl.⁶ ........................................................ A45F 5/00
[52] U.S. Cl. ............................ 224/267; 224/222; 224/277; 108/43
[58] Field of Search .................... 224/219, 222, 224/267, 277, 901.8, 903; 108/42, 43; 281/44, 45; 248/444, 451; D19/88, 91

[56] References Cited

U.S. PATENT DOCUMENTS

| D. 164,269 | 8/1951 | Whittier | D19/88 |
|---|---|---|---|
| D. 267,809 | 2/1983 | Lowery et al. | 281/45 |
| 327,759 | 10/1885 | Boyle | 224/222 |
| 544,684 | 8/1895 | Parker | 248/444 |
| 1,874,813 | 8/1932 | Saunders | 224/903 |
| 2,420,673 | 5/1947 | Monrad | 108/43 |
| 2,516,239 | 7/1950 | Moss | 248/444 |
| 2,881,009 | 4/1959 | Delaney | 108/43 |
| 3,215,453 | 11/1965 | Malcom, Jr. | 408/43 |
| 3,232,685 | 2/1966 | Wilstein et al. | 224/267 |
| 4,998,185 | 3/1991 | DeNigris, Jr. | 108/43 |
| 5,305,381 | 4/1994 | Wang et al. | 379/455 |

FOREIGN PATENT DOCUMENTS

| 103154 | 1/1917 | United Kingdom | 108/43 |

OTHER PUBLICATIONS

Sporty's® Military Spec Kneeboards—Sporty's Kneeboard.
Sporty's® Military Spec Kneeboards—Sporty's Deluxe Lighted Kneeboard.
Pilot's Pal Clipboard.
Catalog page showing the items of aa, ab and ac above.

Primary Examiner—Henry J. Recla
Assistant Examiner—Gregory M. Vidovich
Attorney, Agent, or Firm—Wood, Herron and Evans, P.L.L.

[57] ABSTRACT

A kneeboard is providing having an extending ear to support a hand-held avionics instrument conveniently astride the working surface of the kneeboard.

17 Claims, 1 Drawing Sheet

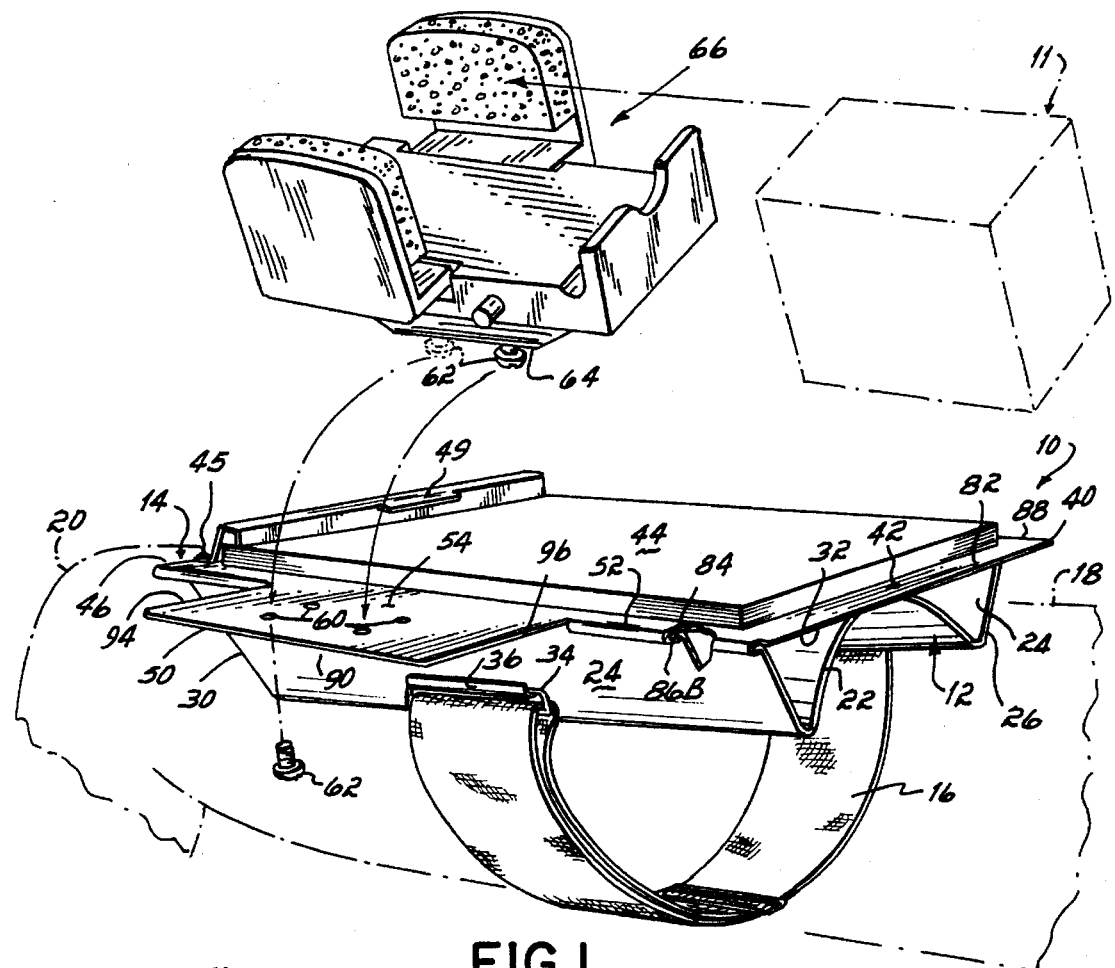
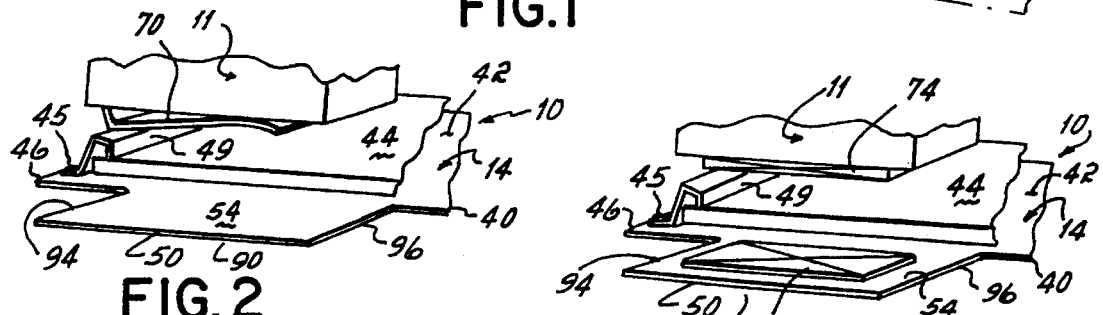
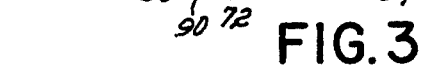
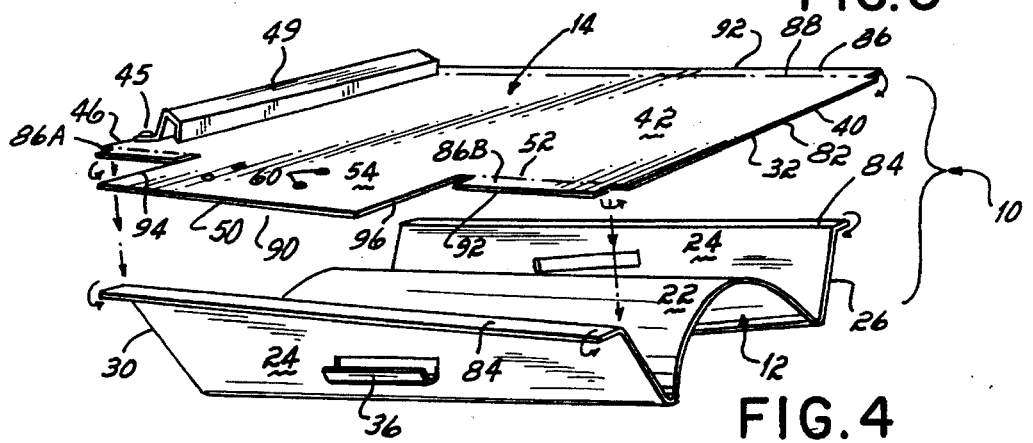

KNEEBOARD WITH SUPPORT EAR

BACKGROUND OF THE INVENTION

1. Field of the Invention

The present invention relates to kneeboards such as are used by pilots for charting during flight.

2. Description of Prior Art

In the cockpit of many airplanes, the pilot may need to chart certain data in connection with proper operation of the aircraft. Kneeboards were developed by which to support these charts in a position for easy use by the pilot. Typical of such kneeboards is that they have a lower leg arch formed to fit comfortably over the leg and a clipboard-like rectangular upper member. A flexible band wraps around the leg and fastens to either side of the leg arch to hold the kneeboard to the user's leg above the knee. The clipboard includes an upper planar work surface and a resiliently biased clip member such as to support a pad of chart paper for writing thereon.

As part of the charting process, reference to various hand-held avionic instruments may be necessary such as portable radios, Global Positioning Systems (GPSS), stopwatches, and the like. Unfortunately, there is limited space inside the cockpit for convenient placement of these instruments. Consequently, the pilot might lay the instrument down to one side, such as on the co-pilot's seat. Or the instrument may be held in a cradle mounted to the wheel. In either case, and as is typical of the crowded space of a cockpit, paper charting may require that the pilot divert attention between the panel mounted instruments, hand-held instrument and the kneeboard quite frequently. When the instrument is not conveniently located, a more cluttered and confusing cockpit environment thus obtains. Worse, the instrument may not be easily viewable or usable by the pilot or may be misplaced leading to serious complications.

SUMMARY OF THE INVENTION

The present invention provides a kneeboard that overcomes many of the disadvantages cited above. To this end, and in accordance with the principles of the present invention, the kneeboard is modified to include an instrument-supporting ear extending from at least one side of the kneeboard by which to support a hand-held avionics instrument (such as a radio, GPSS, or stopwatch, by way of examples) conveniently located astride the chart on the clipboard. A supporting cradle may be attached to the ear to support the instrument. Or the instrument may be directly fastened to the ear. Alternatively, a belt clip attached to the instrument may be received over the ear to hold the instrument to the ear. Further still, attachment may be accomplished with hook and loop (e.g., Velcro®) fasteners.

In one conventional kneeboard, the leg arch is provided by a leg mount formed from a sheet of metal bent to define the leg arch connected to upwardly and outwardly diverging sidewalls for mounting the leg arch to the clipboard. The sidewalls include upper flanges and the clipboard has a lip extending from the edges and turned down and over the leg mount flanges to thus mount the leg arch to the clipboard. The present invention may be advantageously applied to such a conventional construction. To this end, and in accordance with another aspect of the present invention, the ear may be defined by an elongated segment of one of the clipboard lips. The elongated segment is not turned down over the associated leg mount flange and may thus be seen to be in the plane of the clipboard work surface. The ear is preferably positioned midstream of the side edge leaving an upper portion and a lower portion of the lip on that side to be turned down and over the leg mount flange to securably hold the components together.

By virtue of the foregoing, there is thus provided a kneeboard adapted to support a hand-held avionics instrument astride the kneeboard working surface thereby positioning the instrument for more effective and convenient usage by the pilot.

These and other objects and advantages of the present invention shall become apparent from the accompanying drawings and the detailed descriptions thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 1 is a perspective, exploded and partially broken away view of a kneeboard having a support ear constructed in accordance with the principles of the present invention and including a cradle for mounting a hand-held avionics instrument to the kneeboard;

FIG. 2 is an exploded, partial view of the kneeboard of FIG. 1 for describing attachment of a hand-held avionics instrument with a belt clip;

FIG. 3 is an exploded, partial view of the kneeboard of FIG. 1 modified to show a hook and loop fastener arrangement for supporting a hand-held avionics instrument to the kneeboard; and FIG. 4 is an exploded, perspective view of the clipboard and leg mount of the kneeboard of FIG. 1 for purposes of describing assembly of the kneeboard.

DETAILED DESCRIPTION OF THE DRAWINGS

With reference to FIG. 1 there is shown a perspective view of a kneeboard 10 adapted to support a hand-held avionics instrument 11 in accordance with the principles of the present invention. Kneeboard 10 includes a leg mount 12 to which is supportably mounted clipboard 14. Removably mounted to leg mount 12 is also an adjustable length, flexible or elastic band or strap 16 which may be wrapped around a user's leg 18 above knee 20 to hold kneeboard 10 to the leg.

Leg mount 12 includes a lower leg arch portion 22 shaped to conform to the wearer's leg 18. Leg mount 12 also includes sidewalls 24 which are short near bottom end 26 closer to the user's body and tall near top end 30 closer to the knee 20. Sidewalls 24 mount to the underside 32 of clipboard 14. Strap 16 wraps around leg 18 and is attached by metal loops 34 at each strap end (only one shown) to extending tabs 36 on each sidewall 24.

Clipboard 14 includes a generally rectangular work support member or plate 40 (FIG. 3) which has a planar upper surface 42 on which to place a pad of charting paper 44 or the like. Plate 40 may be metal, plastic or coated metal. Mounted (such as with rivets 45) along the top edge 46 of work surface 42 is resiliently biased clip 49 by which to removably hold pad 44 to the clipboard as is conventional.

In accordance with a principle feature of the present invention, ear 50 is provided as an extension of plate 40 along left edge 52 of plate 40. The upper surface 54 of ear 50 is in the same plane as upper surface 42 of plate 40. Ear 50 may advantageously be used to support a hand-held avionics instrument such as a radio, GPSS device, or stopwatch or the like so that the instrument is conveniently astride pad 44 on work surface 42. To this end, as shown in FIG. 1, a plurality of holes 60 are bored through ear 50 to receive screws 62 therethrough. Screws 62, in turn, are threadably received into holes (not shown) in the bottom side 64 of cradle 66 (such as the cradle shown in U.S. Pat. No. 5,305,381) to affix cradle 66 to ear 50. Instrument 11 may then be mounted to cradle 66 such that the instrument is indirectly supported by ear 50 in a convenient and proper location for use and easy reference by the pilot in connection with use of kneeboard 10. Alternatively, instrument 11 may be mounted directly to ear 50 such as by inserting screws 62 (such as ⅛ screws) through holes 60 and threading them directly into the backside of instrument 11.

Other mechanisms to attach a hand-held avionic instrument to ear 50 may be utilized as well. Many will occur to those ordinarily skilled in the art. Preferably ear 50 is relatively thin as shown in FIG. 2. Thin ear 50 may receive thereover (from the top or the side, for example) a clip or the like such as belt clip 70 conventionally mounted to the backside of instrument 11 to thus mount instrument 11 to kneeboard 10 for use and reference as above-described. Another example may be hook and loop attachments such as Velcro® fasteners. To this end, as shown in FIG. 3, one component 72 of a Velcro® fastener may be permanently adhered to ear 50 with the other, mating component 74 permanently adhered to instrument 11. When instrument 11 is placed against ear 50, components 72,74 lock together to hold instrument 11 in proper position for use with kneeboard 10. Instrument 11 may be easily removed from ear 50 when no longer necessary by "tearing" the instrument from ear 50.

As viewed from FIG. 1, it will be seen that ear 50 is situated midstream between top 46 and bottom 82 of left edge 52 of plate 40. This placement is particularly advantageous for the manufacture of kneeboard 10 as will now be explained with reference to FIG. 4. To this end, in a particularly preferred form of the invention, leg mount 12 is defined by a formed sheet of metal or plastic and includes leg arch portion 22 between integral and outwardly diverging sidewalls 24. Sidewalls 24 terminate in peripheral side flanges 84 extending from sidewalls 24. Similarly, clipboard 12 includes peripheral lips 86 extending from left and right side edges 52 and 88 of plate 40. The left ear 52 includes upper lip portion 86A and lower lip portion 86B with an elongated, central segment 90 therebetween. The lips 86 of plate 40 (including left lip portions 86A and 86B but not elongated segment 90) are folded down and over flanges 84 of leg mount 12 (as shown in FIG. 1) so as to mount leg arch 22 with support plate 40. Central segment 90 of left edge lip 86 is elongated about 3 inches beyond the normal terminal edge 92 of lip portions 86A and 86B, and is not folded down but left extending outwardly in the plane of plate 40 to define ear 50. Where edge 52 is about 9 inches long, ear 50 is about 4 inches long. In this regard, holes 60 are spaced 3¹⁵⁄₁₆ and 5¼ from a centerline of working surface 42; and 1¼ and 2¾ from the top and bottom edges 94,96 of ear 50.

In use, a pilot places kneeboard 10 over the leg 18 above knee 20 with leg arch 22 against the leg. Strap 16 is wrapped around leg 18 and its loops 34 hooked to tabs 36. A chart pad 44 is clipped to board 14 as is conventional. A hand-held avionics instrument is also mounted in supporting relationship to ear 50 so that it is conveniently placed astride board 14 for use and reference by the pilot.

By virtue of the foregoing, there is thus provided a kneeboard adapted to support a hand-held avionics instrument astride the work surface of the kneeboard thereby positioning the tool for more effective and convenient usage by the pilot.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, while ear 50 is shown along left edge 52, a similar ear could alternatively or additionally be provided along other edges of board 14 such as right edge 88.

Alternatively, ear 50 could be associated with clipboard 14 by being formed with leg mount 12 rather than clipboard 14, or located at different points of the clipboard edge so long as ear 50 extends beyond the area on which the chart pad 44, for example, is to be placed and used. The invention in its broader aspects is therefore not limited to the specific details, representative apparatus and methods and illustrative examples shown and described. Accordingly, departures may be made from such details without departing from the spirit or scope of the general inventive concept.

Having described the invention, what is claimed is:

1. An avionics kneeboard comprising:

a leg arch adapted to sit on a leg of a pilot, said leg arch having a pair of sidewalls, each said sidewall having an upper flange;

means for holding the leg arch to said pilot's leg;

a generally flat work surface mounted with the leg arch, the work surface having a pair of spaced sides, each said side having at least one lip which captures one of said upper flanges;

a clip associated with the work surface for holding a paper to the work surface; and a hand-held avionics instrument supporting ear associated with the clipboard and extending beyond the periphery of the work surface, one of said sides having first and second spaced apart lips for capturing one of said flanges, said ear being positioned between said first and second lips and on said one side, the ear including means for supporting said instrument in a convenient position relative to the work surface.

2. The kneeboard of claim 1, the ear being an extended portion of the work surface.

3. The kneeboard of claim 1, the ear having hole means for receiving screws therethrough to define the supporting means.

4. The kneeboard of claim 3 further comprising an avionics instrument supporting cradle affixed to the ear by screws received in said hole means.

5. The kneeboard of claim 1 wherein the support means includes an avionics instrument supporting cradle affixed to the ear.

6. The kneeboard of claim 1 wherein the ear is thin so as to be receivable into a belt clip associated with a hand-held avionics instrument whereby to define the support means.

7. The kneeboard of claim 1 wherein the support means includes a component of a hook and loop fastener on the ear.

8. A kneeboard having:

a leg mount having a leg arch connected to a pair of sidewalls, each of the sidewalls terminating in a flange;

a clipboard having a work surface with a pair of edges adjacent respective ones of the leg mount and sidewalls, and at least one lip associated with each work surface edge, each of the lips capturing a respective one of the leg mount flanges, one of the edges having a segment to define an instrument supporting ear whereby to provide an area of support for an instrument astride the work surface, said ear being positioned between a first said lip and a second said lip on said one edge, said first and second lips being spaced apart.

9. The kneeboard of claim 8 further comprising a strap associated with the leg mount.

10. The kneeboard of claim 8, the ear having hole means for receiving screws therethrough.

11. The kneeboard of claim 10 further comprising an instrument supporting cradle affixed to the ear by screws.

12. The kneeboard of claim 8 further comprising an instrument supporting cradle affixed to the ear.

13. The kneeboard of claim 8 further comprising a component of a hook and loop fastener on the ear.

14. A method of mounting a hand-held avionics instrument relative a chart for use by a pilot comprising:

mounting the chart on a kneeboard having a leg arch;

mounting the leg arch of the kneeboard on the pilot's leg; and mounting the instrument on an extending ear associated with the kneeboard, said ear being positioned between first and second spaced apart lips which capture a flange of the leg arch, said lips being on one side of the kneeboard.

15. The method of claim 14 further comprising mounting the instrument directly to the ear.

16. The method of claim 14 wherein the instrument includes a belt clip, the method further comprising mounting the instrument to the ear by sliding the belt clip over the ear.

17. The method of claim 14 further comprising mounting a cradle to the ear and mounting the instrument to the cradle.

* * * * *

UNITED STATES PATENT AND TRADEMARK OFFICE
CERTIFICATE OF CORRECTION

PATENT NO. : 5,615,817
DATED : April 1, 1997
INVENTOR(S) : Harold Shevers, Jr.

It is certified that error appears in the above-indentified patent and that said Letters Patent is hereby corrected as shown below:

In Column 3, line 18, "(1/8 screws)" should read -- (1/8" screws) --.

In Column 3, lines 60 and 61, "3 15/16 and 5 1/4", and "1 1/4 and 2 3/4" should read -- 3 15/15" and 5 1/4" -- and -- 1 1/4" and 2 3/4" --.

Signed and Sealed this

Tenth Day of February, 1998

Attest:

BRUCE LEHMAN

*Attesting Officer*   *Commissioner of Patents and Trademarks*